United States Patent Office 3,156,263
Patented Nov. 10, 1964

3,156,263
METHOD FOR PIPE CLOSURE
Barnet R. Adelman, Atherton, Calif., assignor to United
Aircraft Corporation, a corporation of Delaware
Filed Feb. 9, 1962, Ser. No. 172,267
4 Claims. (Cl. 138—89)

This invention relates to a method and structure for closing a pipe or similar member at a desired time. More particularly the invention relates to a method of closing a pipe after a desired time lapse in a rocket engine or similar structure.

In many applications it is desirable to provide a means of closing a pipe after a desired time lag such as in manifolding the igniters of clustered rocket engines. In such systems, a small line leads between two or more rocket engine igniters so that in the event of failure of one of the igniters, hot gas will be conveyed to the other causing it to ignite. After a short time of flow the line must be closed. Such a system must be simple and reliable and need operate only once. The device of the present invention is ideal for this and similar applications.

In general the objects of this invention are achieved by providing a lining material for a pipe which lining material will swell and obturate or close the pipe at a predetermined interval.

In the drawings forming a part of this application:

Figure 1:
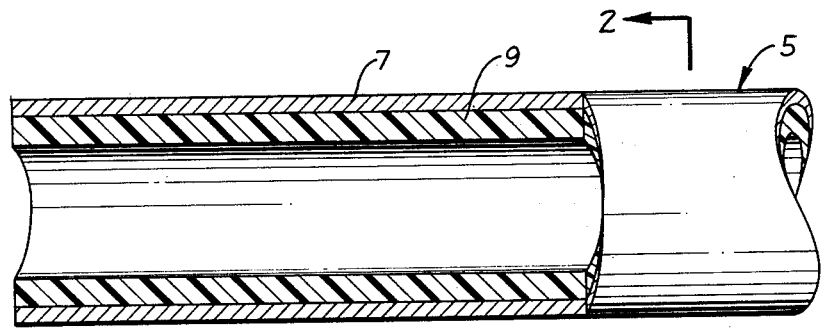
FIGURE 1 is a side view, partially in section of a pipe embodying the present invention.
Figure 2:
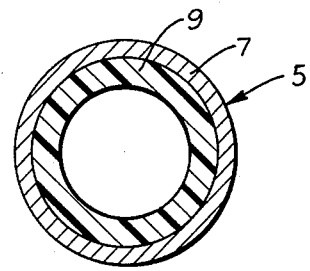
FIGURE 2 is a sectional view on the lines 2—2 of FIGURE 1.
Figure 3:
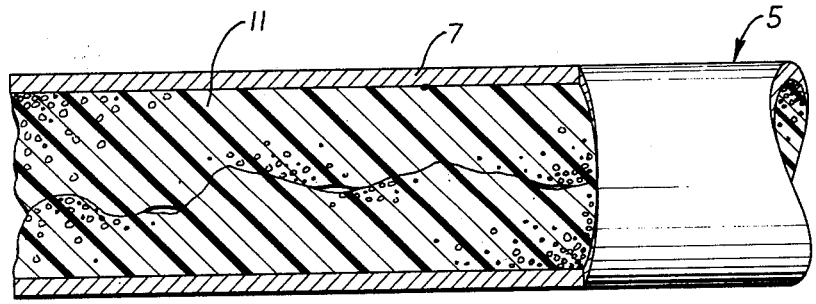
FIGURE 3 is a view, similar to FIGURE 1, showing the pipe after it has been obturated.

Referring now to the drawings by reference characters there is shown a pipe generally designated 5 having a wall 7 of a suitable construction material such as steel. The inside of the pipe is coated as 9 with a layer of a foaming material which swells upon being subjected to a given amount of heat. After a sufficient amount of hot gas has passed through the line, the line will be choked, as is shown in FIGURE 3 by the expanded mass 11 of the material which formally formed the coating inside the pipe.

The material which forms a coating inside the pipe is one of an elastomeric nature with a material incorporated therein which causes the plastic to foam or otherwise swell. Typical materials include butyl rubber filled with sodium azide, ammonia oxilate or sodium carbonate. Further, a single material such as a phenolic resin may be used as the coating material since it is well known that during pyrolysis such materials swell. If desired, a ceramic material may also be incorporated in the coating to produce a closure of even greater strength. Thus, the coating material might comprise a plastic, such as polyethylene with a mixture of sodium carbonate and finely divided silica therein. On being subjected to high temperature, the carbonate would decompose, releasing carbon dioxide causing the plastic to swell and to eventually close the pipe. It will be obvious to those skilled in the art, that the thickness of the coating selected will depend on the nature of the coating as well as the diameter of the pipe and the desired length of time for which one wishes gas or a material to flow through the pipe. Thus, if a quick closed pipe were desired, a relatively thick coating might be employed while if longer time were desired, a relatively thin coating is ordinarily used. Further, various coating materials have various degrees of resistance to high temperature gas so that the time of closing can be regulated by the selection of the coating material.

I claim:

1. A method of closing a pipe comprising providing a coating within said pipe, said coating being adapted to swell irreversibly and close the pipe when subjected to high temperature material flowing through the pipe.

2. The method of claim 1 wherein said coating is a plastic material incorporating a substance therein which releases gas upon being subjected to a high temperature.

3. The method of claim 1 wherein the coating is butyl rubber with sodium carbonate dispersed therein.

4. A self closing pipe comprising a pipe having an internal coating therein, said coating comprising an irreversibly heat foamable material which will swell upon the application of heat to close the pipe.

References Cited by the Examiner
UNITED STATES PATENTS

| 2,241,086 | 5/41 | Gould _____ 251—5 XR |
| 2,319,498 | 5/43 | Gerard _____ 138—45 XR |
| 2,320,371 | 6/43 | Manning _____ 138—89 |
| 2,690,987 | 10/54 | Jeffries et al. |
| 2,744,042 | 5/56 | Pace. |
| 2,752,951 | 7/56 | Silverstein _____ 138—45 |
| 2,959,508 | 11/60 | Grahm et al. |

EDWARD V. BENHAM, *Primary Examiner.*